United States Patent
Edwards et al.

(10) Patent No.: US 11,184,831 B2
(45) Date of Patent: *Nov. 23, 2021

(54) SOLAR-POWERED RELAY FOR COUPLING REMOTELY-LOCATED LEAF NODES TO A WIRELESS NETWORK

(71) Applicant: ITRON, INC., Liberty Lake, WA (US)

(72) Inventors: Bruce Edwards, San Jose, CA (US); Kunal Pankaj Shah, Mountain View, CA (US)

(73) Assignee: ITRON, INC., Liberty Lake, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/237,558

(22) Filed: Dec. 31, 2018

(65) Prior Publication Data

US 2020/0213930 A1 Jul. 2, 2020

(51) Int. Cl.
*H04W 40/10* (2009.01)
*H04W 40/12* (2009.01)
(Continued)

(52) U.S. Cl.
CPC ............. *H04W 40/10* (2013.01); *H02S 40/30* (2014.12); *H04B 7/155* (2013.01); *H04L 47/24* (2013.01); *H04W 40/12* (2013.01)

(58) Field of Classification Search
CPC ........ H04L 47/10; H04L 47/24; H04W 40/02; H04W 40/24; H04W 40/34; H04W 40/12; H04B 7/155
See application file for complete search history.

(56) References Cited

U.S. PATENT DOCUMENTS

| 4,476,853 A | 10/1984 | Arbogast |
| 4,494,854 A | 1/1985 | Yamaga et al. |

(Continued)

FOREIGN PATENT DOCUMENTS

| CN | 103139936 A | 6/2013 | |
| CN | 103338532 A | * 10/2013 | ............ H04W 88/08 |

(Continued)

OTHER PUBLICATIONS

International Search Report for application No. PCT/US2019/068032 dated Mar. 3, 2020.
(Continued)

*Primary Examiner* — Robert C Scheibel
*Assistant Examiner* — Prenell P Jones
(74) *Attorney, Agent, or Firm* — Artegis Law Group, LLP

(57) ABSTRACT

A solar-powered device (SPD) relay node is coupled to a remotely-located "leaf" node in order to provide the leaf node with network access. The SPD relay node routes network traffic to and from the leaf node via one or more different paths that traverse other SPD relay nodes that reside upstream of the SPD relay node. The SPD relay node determines a specific path across which to route the network traffic based on several different factors associated with the upstream SPD relay nodes, including battery level, solar generation rate, and link quality. The SPD relay node generates a routing metric for each upstream SPD relay node based on these different factors and then routes traffic across the upstream SPD relay nodes based on the routing metric and based on a priority level associated with the network traffic.

19 Claims, 10 Drawing Sheets

(51) Int. Cl.
  *H02S 40/30* (2014.01)
  *H04B 7/155* (2006.01)
  *H04L 12/851* (2013.01)

(56) References Cited

U.S. PATENT DOCUMENTS

| | | | |
|---|---|---|---|
| 4,667,142 A | 5/1987 | Butler | |
| 5,387,858 A | 2/1995 | Bender et al. | |
| 5,411,537 A | 5/1995 | Munshi et al. | |
| 5,920,827 A | 7/1999 | Baer et al. | |
| 5,998,052 A | 12/1999 | Yamin | |
| 6,127,797 A | 10/2000 | Walker | |
| 6,204,636 B1 | 3/2001 | Kinoshita et al. | |
| 6,763,237 B1 * | 7/2004 | Katz | H04B 7/0608 370/329 |
| 6,813,897 B1 | 11/2004 | Bash et al. | |
| 7,038,333 B2 | 5/2006 | Bourilkov et al. | |
| 7,345,371 B1 | 3/2008 | Kuelbs | |
| 7,518,253 B2 | 4/2009 | Kuelbs | |
| 7,615,962 B1 | 11/2009 | Kuelbs | |
| 7,688,222 B2 | 3/2010 | Peddie et al. | |
| 7,688,778 B2 | 3/2010 | Ogushi | |
| 7,760,109 B2 | 7/2010 | Broad et al. | |
| 7,772,798 B2 | 8/2010 | Rodas et al. | |
| 7,825,615 B2 | 11/2010 | Chen et al. | |
| 7,830,110 B1 | 11/2010 | Kuelbs | |
| 7,859,431 B2 | 12/2010 | Peddie et al. | |
| 8,035,337 B1 | 10/2011 | Oakenfull | |
| 8,129,850 B2 | 3/2012 | Kuelbs et al. | |
| 8,149,717 B2 | 4/2012 | Gossain et al. | |
| 8,188,878 B2 | 5/2012 | Pederson et al. | |
| 8,390,244 B2 | 3/2013 | Wooley et al. | |
| 8,421,252 B1 | 4/2013 | Kuelbs et al. | |
| 8,421,401 B2 | 4/2013 | Wen | |
| 8,422,256 B2 | 4/2013 | Giuntini et al. | |
| 8,525,441 B2 | 9/2013 | Shuy et al. | |
| 8,588,830 B2 | 11/2013 | Myer et al. | |
| 8,618,934 B2 | 12/2013 | Belov et al. | |
| 8,707,075 B2 | 4/2014 | Broad et al. | |
| 8,716,889 B2 | 5/2014 | Vaidyanathan | |
| 8,787,392 B2 | 7/2014 | Vasseur et al. | |
| 8,803,362 B2 | 8/2014 | Schmiegel | |
| 8,811,234 B2 | 8/2014 | Gossain et al. | |
| 8,896,151 B2 | 11/2014 | Yamane et al. | |
| 8,901,411 B2 | 12/2014 | Liu et al. | |
| 8,902,076 B2 | 12/2014 | Pederson et al. | |
| 8,929,228 B2 | 1/2015 | Budampati et al. | |
| 8,941,252 B1 | 1/2015 | Kuelbs et al. | |
| 8,970,394 B2 | 3/2015 | Veillette | |
| 9,019,122 B2 | 4/2015 | Heller | |
| 9,086,686 B2 | 7/2015 | Kojima et al. | |
| 9,087,338 B2 | 7/2015 | Levine et al. | |
| 9,090,253 B2 | 7/2015 | Flath et al. | |
| 9,103,567 B2 | 8/2015 | Dwyer et al. | |
| 9,167,516 B2 | 10/2015 | Brendas | |
| 9,236,751 B2 | 1/2016 | Goei et al. | |
| 9,300,581 B1 | 3/2016 | Hui et al. | |
| 9,344,365 B1 | 5/2016 | Hui et al. | |
| 9,369,374 B1 | 6/2016 | Hui et al. | |
| 9,385,953 B1 | 7/2016 | Hui et al. | |
| 9,413,457 B2 | 8/2016 | Pederson et al. | |
| 9,465,078 B2 | 10/2016 | Betzner | |
| 9,568,522 B2 | 2/2017 | Aiello et al. | |
| 9,581,972 B1 | 2/2017 | Arrow et al. | |
| 9,621,462 B2 | 4/2017 | Hui et al. | |
| 9,655,207 B2 | 5/2017 | Monaci et al. | |
| 9,780,567 B2 | 10/2017 | Hunt et al. | |
| 9,788,400 B2 | 10/2017 | Flinsenberg et al. | |
| 9,839,088 B1 | 12/2017 | Deaton | |
| 9,843,286 B2 | 12/2017 | Sills et al. | |
| 9,847,944 B2 | 12/2017 | Chow et al. | |
| 9,889,915 B2 | 2/2018 | Zhang et al. | |
| 9,893,985 B2 | 2/2018 | Hui et al. | |
| 10,006,666 B2 | 6/2018 | Tamaura | |
| 10,209,283 B2 | 2/2019 | Aiello et al. | |
| 10,313,967 B2 | 6/2019 | Chandra et al. | |
| 10,359,797 B2 | 7/2019 | Carlson | |
| 10,455,395 B2 | 10/2019 | Gharabegian | |
| 10,514,140 B2 | 12/2019 | Sreshta et al. | |
| 10,539,964 B2 | 1/2020 | Minorics | |
| 10,567,280 B2 | 2/2020 | Hui et al. | |
| 10,594,145 B1 | 3/2020 | Wang et al. | |
| 10,608,962 B2 | 3/2020 | Edwards | |
| 10,612,738 B1 | 4/2020 | Sreshta et al. | |
| 10,647,449 B2 | 5/2020 | Wasson et al. | |
| 10,687,228 B2 | 6/2020 | Gardner | |
| 10,718,500 B1 | 7/2020 | Tylicki et al. | |
| 10,727,682 B2 | 7/2020 | Park et al. | |
| 10,785,719 B2 | 9/2020 | Chandra et al. | |
| 2003/0155887 A1 | 8/2003 | Bourilkov et al. | |
| 2005/0257827 A1 | 11/2005 | Gaudiana et al. | |
| 2005/0270175 A1 * | 12/2005 | Peddie | E01F 9/559 340/907 |
| 2006/0002368 A1 * | 1/2006 | Budampati | H04L 45/02 370/351 |
| 2006/0039316 A1 | 2/2006 | Ogushi | |
| 2006/0187656 A1 | 8/2006 | Kuelbs et al. | |
| 2006/0204795 A1 | 9/2006 | Schulman | |
| 2006/0220843 A1 | 10/2006 | Broad et al. | |
| 2008/0001735 A1 | 1/2008 | Tran | |
| 2008/0191491 A1 | 8/2008 | Kuelbs | |
| 2008/0243079 A1 | 10/2008 | Wooley et al. | |
| 2008/0246339 A1 | 10/2008 | Rodas et al. | |
| 2008/0310850 A1 | 12/2008 | Pederson et al. | |
| 2009/0029645 A1 * | 1/2009 | Leroudier | H04W 84/047 455/7 |
| 2009/0096399 A1 | 4/2009 | Chen et al. | |
| 2009/0173375 A1 | 7/2009 | Frazier et al. | |
| 2009/0236911 A1 | 9/2009 | Carroll | |
| 2009/0256723 A1 | 10/2009 | Peddie et al. | |
| 2010/0029268 A1 | 2/2010 | Myer et al. | |
| 2010/0057267 A1 | 3/2010 | Liu et al. | |
| 2010/0060231 A1 | 3/2010 | Trainor et al. | |
| 2010/0231386 A1 * | 9/2010 | Barnes | H01L 31/04 340/541 |
| 2010/0253090 A1 | 10/2010 | Kuelbs et al. | |
| 2010/0271199 A1 | 10/2010 | Belov et al. | |
| 2010/0303005 A1 * | 12/2010 | Gossain | H04L 45/124 370/328 |
| 2011/0080044 A1 | 4/2011 | Schmiegel | |
| 2011/0127958 A1 | 6/2011 | Ishishita et al. | |
| 2011/0156634 A1 | 6/2011 | Lai | |
| 2011/0234148 A1 | 9/2011 | Wen | |
| 2011/0291483 A1 | 12/2011 | Yamane et al. | |
| 2011/0295575 A1 | 12/2011 | Levine et al. | |
| 2011/0308574 A1 | 12/2011 | Vaidyanathan | |
| 2012/0007441 A1 | 1/2012 | John | |
| 2012/0020060 A1 | 1/2012 | Myer et al. | |
| 2012/0026764 A1 | 2/2012 | Giuntini et al. | |
| 2012/0143383 A1 | 6/2012 | Cooperrider et al. | |
| 2012/0147780 A1 | 6/2012 | Gossain et al. | |
| 2012/0155475 A1 * | 6/2012 | Vasseur | H04L 45/028 370/400 |
| 2012/0166848 A1 | 6/2012 | Broad et al. | |
| 2012/0191252 A1 | 7/2012 | Rockenfeller et al. | |
| 2012/0192025 A1 | 7/2012 | Veillette | |
| 2012/0200235 A1 | 8/2012 | Shuy et al. | |
| 2012/0230696 A1 | 9/2012 | Pederson et al. | |
| 2012/0260967 A1 * | 10/2012 | Dwyer | H02S 20/30 136/244 |
| 2012/0290857 A1 | 11/2012 | Broad et al. | |
| 2012/0327831 A1 * | 12/2012 | Arendas | H04W 52/0216 370/311 |
| 2013/0000695 A1 | 1/2013 | Giri | |
| 2013/0000696 A1 | 1/2013 | Giri | |
| 2013/0002027 A1 | 1/2013 | Yu et al. | |
| 2013/0063073 A1 | 3/2013 | Kawasaki et al. | |
| 2013/0021002 A1 | 6/2013 | Mayes | |
| 2013/0234645 A1 | 9/2013 | Goei et al. | |
| 2013/0324059 A1 | 12/2013 | Lee et al. | |
| 2014/0080406 A1 | 3/2014 | Freitas et al. | |
| 2014/0129163 A1 | 5/2014 | Betzner | |
| 2014/0216528 A1 | 8/2014 | Vaidyanathan | |

(56) References Cited

U.S. PATENT DOCUMENTS

| | | | |
|---|---|---|---|
| 2014/0297206 A1 | 12/2014 | Silverman | |
| 2014/0368046 A1 | 12/2014 | MacWilliams et al. | |
| 2015/0001945 A1 | 1/2015 | Estes | |
| 2015/0016260 A1* | 1/2015 | Chow | H04L 47/125 370/235 |
| 2015/0021990 A1 | 1/2015 | Myer et al. | |
| 2015/0086213 A1 | 3/2015 | Pederson et al. | |
| 2015/0088253 A1 | 3/2015 | Doll et al. | |
| 2015/0213709 A1 | 7/2015 | Miller et al. | |
| 2015/0244306 A1 | 8/2015 | Estes | |
| 2015/0260430 A1 | 9/2015 | Tamaura | |
| 2015/0303710 A1 | 10/2015 | John | |
| 2016/0094079 A1 | 3/2016 | Hiroki et al. | |
| 2016/0109497 A1 | 4/2016 | Aiello et al. | |
| 2016/0111918 A1 | 4/2016 | Benson | |
| 2016/0141879 A1 | 5/2016 | Motsenbocker | |
| 2016/0149805 A1* | 5/2016 | Hui | H04W 40/125 370/389 |
| 2016/0179994 A1 | 6/2016 | Levine et al. | |
| 2016/0192126 A1 | 6/2016 | Dubey et al. | |
| 2016/0198548 A1 | 7/2016 | Monaci et al. | |
| 2016/0226305 A1 | 8/2016 | Estes | |
| 2016/0226761 A1* | 8/2016 | Hui | H04L 45/16 |
| 2016/0286444 A1* | 9/2016 | Wang | H04W 36/04 |
| 2016/0315506 A1 | 10/2016 | John | |
| 2016/0320787 A1 | 11/2016 | Carlson | |
| 2016/0322835 A1 | 11/2016 | Carlson et al. | |
| 2016/0336623 A1 | 11/2016 | Nayar et al. | |
| 2016/0344476 A1* | 11/2016 | Pederson | G08B 13/19663 |
| 2017/0025983 A1 | 1/2017 | Sills et al. | |
| 2017/0064599 A1 | 3/2017 | Caine et al. | |
| 2017/0079124 A1* | 3/2017 | Flinsenberg | H05B 47/22 |
| 2017/0168098 A1 | 6/2017 | Aiello et al. | |
| 2017/0222923 A1* | 8/2017 | Hui | H04W 8/26 |
| 2017/0302218 A1 | 10/2017 | Janik | |
| 2018/0001985 A1* | 1/2018 | Zhang | F02D 11/105 |
| 2018/0063037 A1 | 3/2018 | Edwards | |
| 2018/0097467 A1* | 4/2018 | Sills | G05B 15/02 |
| 2018/0109458 A1 | 4/2018 | Chow et al. | |
| 2018/0115185 A1 | 4/2018 | John | |
| 2018/0128438 A1 | 5/2018 | Sreshta et al. | |
| 2018/0184907 A1 | 7/2018 | Tran | |
| 2018/0202224 A1 | 7/2018 | Kumar | |
| 2018/0226697 A1 | 8/2018 | Edwards | |
| 2018/0227849 A1 | 8/2018 | Edwards | |
| 2018/0268689 A1 | 9/2018 | Lewis | |
| 2018/0269685 A1 | 9/2018 | Sugeno et al. | |
| 2018/0302853 A1 | 10/2018 | Chandra et al. | |
| 2019/0019632 A1* | 1/2019 | Rusling | A61N 1/378 |
| 2019/0027951 A1 | 1/2019 | Park et al. | |
| 2019/0061885 A1 | 2/2019 | Baro et al. | |
| 2019/0098725 A1* | 3/2019 | Sadwick | H05B 47/175 |
| 2019/0133303 A1 | 5/2019 | Thiel et al. | |
| 2019/0137631 A1* | 5/2019 | Rayudu | G01S 19/44 |
| 2019/0159412 A1 | 5/2019 | Guidish et al. | |
| 2019/0171221 A1* | 6/2019 | Minorics | G08G 1/164 |
| 2019/0181678 A1 | 6/2019 | Jiang et al. | |
| 2019/0230589 A1 | 7/2019 | Chandra et al. | |
| 2019/0257686 A1 | 8/2019 | Popat | |
| 2019/0259892 A1* | 8/2019 | Moslehl | H02S 40/30 |
| 2019/0326501 A1* | 10/2019 | Gilbert | H02K 3/02 |
| 2019/0364492 A1* | 11/2019 | Azizi | H04W 68/005 |
| 2019/0367191 A1* | 12/2019 | Wasson | B64G 1/52 |
| 2019/0394654 A1* | 12/2019 | Gardner | H04W 40/02 |
| 2020/0099336 A1 | 3/2020 | Monforte et al. | |
| 2020/0112087 A1* | 4/2020 | Kulkarni | B60S 1/0862 |
| 2020/0116320 A1 | 4/2020 | Sreshta et al. | |
| 2020/0120513 A1 | 4/2020 | Cahillo-O'Brien et al. | |
| 2020/0120575 A1 | 4/2020 | Cahillo-O'Brien et al. | |
| 2020/0125157 A1 | 4/2020 | Kachare et al. | |
| 2020/0169219 A1 | 5/2020 | Zhang et al. | |
| 2020/0205062 A1 | 6/2020 | Azizi et al. | |
| 2020/0213929 A1 | 7/2020 | Edwards et al. | |
| 2020/0213930 A1 | 7/2020 | Edwards et al. | |

FOREIGN PATENT DOCUMENTS

| | | | | |
|---|---|---|---|---|
| KR | 10-2018-0020717 A | | 2/2018 | |
| WO | 2012064906 A2 | | 5/2012 | |
| WO | WO-2017199229 A1 * | | 11/2017 | H04B 17/318 |

OTHER PUBLICATIONS

Non-Final Office Action received for U.S. Appl. No. 16/237,554 dated Aug. 5, 2020, 36 pages.

Final Office Action received for U.S. Appl. No. 16/237,554 dated Jan. 13, 2021, 29 pages.

International Search Report for application No. PCT/US2019/068082 dated Mar. 11, 2020.

Non Final Office Action received for U.S. Appl. No. 16/237,562 dated May 14, 2020, 37 pages.

Final Office Action received for U.S. Appl. No. 16/237,562 dated Nov. 24, 2020, 40 pages.

Notice of Allowance received for U.S. Appl. No. 16/237,562 dated Mar. 4, 2021, 6 pages.

International Search Report for application No. PCT/US2019/068073 dated Mar. 9, 2020.

Non-Final Office Action received for U.S. Appl. No. 16/237,554 dated Jul. 7, 2021, 296 pages.

Notice of Allowance received for U.S. Appl. No. 16/237,562 dated Jun. 23, 2021, 61 pages.

* cited by examiner

SOLAR-POWERED RELAY FOR COUPLING REMOTELY-LOCATED LEAF NODES TO A WIRELESS NETWORK

BACKGROUND

Field of the Various Embodiments

Embodiments of the present invention relate generally to wireless networks and, more specifically, to a solar-powered relay for coupling remotely-located leaf nodes to a wireless network.

Description of the Related Art

A conventional utility distribution infrastructure typically includes multiple consumers, such as households and businesses, coupled to a set of intermediate distribution entities. The set of intermediate distribution entities draws resources from upstream providers and distributes those resources to the downstream consumers. In a modern utility distribution infrastructure, the consumers as well as the intermediate distribution entities may include various network devices, such as smart utility meters, that are networked together to form a wireless network. The network devices monitor the distribution of resources via the utility distribution infrastructure in real time to generate metrology data. The metrology data is periodically reported across the wireless network to a utility provider that owns and/or operates the utility distribution infrastructure.

Utility distribution infrastructures oftentimes span wide geographical areas. Accordingly, when a given utility distribution infrastructure includes network devices for monitoring resource distribution, as described above, those network devices may or may not be located near other network devices in the utility distribution infrastructure. For example, some network devices may reside in central regions of the utility distribution infrastructure where many other network devices reside. Usually these centrally-located network devices can communicate effectively with one another and, therefore, are able to access the wireless network reliably to report metrology data. Other network devices, however, may reside in remote regions of the utility distribution infrastructure where few other network devices reside. Consequently, these remotely-located network devices sometimes cannot communicate with one another effectively and, therefore, and are not able to access the wireless network reliably to report metrology data.

To provide a remotely-located network device with more reliable network access, a network device relay can be coupled between the remotely-located network device and other portions of the wireless network within the utility distribution infrastructure. The network device relay is typically coupled to mains power and deployed on a utility pole proximate to where the remotely-located network device resides. In operation, the network device relay forwards network traffic received from the remotely-located network device to the wireless network and forwards network traffic received from the wireless network to the remotely-located network device. In this manner, the network device relay operates as an intermediary between the remotely-located network device and the wireless network.

One drawback of the above remedy is that conventional network device relays lose power during power outages, causing any remotely-located network devices that are coupled to the network device relay to lose network connectivity. Some network device relays include a backup battery that allows continued operation for a short "holdup" period when power is lost. However, this holdup period is generally around eight hours, which is insufficient for many utility providers.

Another drawback of the above remedy is that conventional network device relays are typically quite expensive. In particular, given network device relays usually include complicated power management systems for drawing electricity from mains power. These power management systems can be costly to manufacture. Further, deploying a given network device is a complicated and, therefore, costly process. For example, to deploy a network device relay, a technician has to ascend a utility pole, physically mount the network device relay to the utility pole, and then electrically couple the network device relay to a high-voltage power line. Finally, maintaining a given network device relay that is coupled to a utility pole can be costly due to recurring pole lease fees. Because of these types of costs, utility providers oftentimes maximize the number of remotely-located network devices that are coupled to any given network device relay in order to minimize the number of network device relays that need to be deployed. One consequence of this strategy, however, is that network device relays that are coupled to numerous remotely-located network devices can become overloaded with traffic. When a given network device relay becomes overloaded with traffic, the rate at which that network device relay can process network traffic slows down, which can cause significant network latencies for the remotely-located network devices coupled to the network device relay. In some cases, a network device relay can become so overloaded with network traffic that latencies of up to several hours can occur. Such large latencies can limit the effectiveness with which the associated remotely-located network devices can communicate.

As the foregoing illustrates, what is needed in the art are more effective ways to provide connectivity to remotely-located network devices within wireless network.

SUMMARY

Some embodiments include a system, comprising a power subsystem that includes a secondary power cell that stores a first portion of power that is consumed during a first time interval when performing network communications with one or more nodes included in a wireless network, and a solar panel that, when exposed to a first level of irradiance during a second time interval, generates the first portion of power for storage in the secondary power cell, wherein the first time interval comprises an interval of continuous darkness and the second time interval comprises an interval of continuous daylight. The system further comprises a network subsystem that determines a first set of operational statuses associated with a first set of nodes included in the wireless network, generates a first set of routing metrics corresponding to the first set of nodes based on the first set of operational statuses, and relays network traffic received from a leaf node included in the wireless network to the first set of nodes based on the first set of routing metrics.

One technological advantage of the disclosed approach is that the SPD relay node continues to operate normally during power outages because the SPD relay node does not rely on mains power. Accordingly, the SPD relay node can meet the holdup period requirements set forth by many utility providers.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
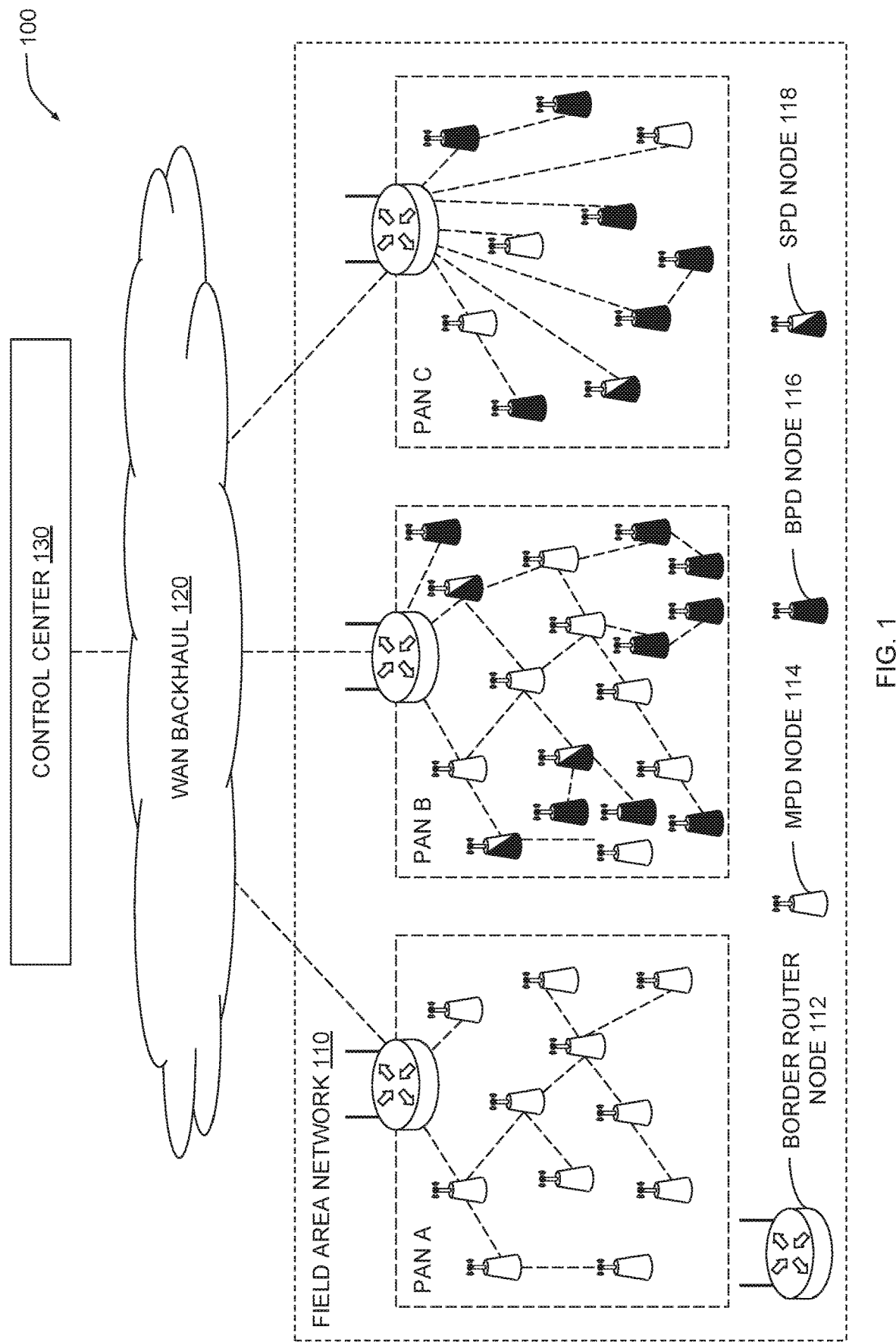
FIG. 1 illustrates a network system configured to implement one or more aspects of the present embodiments.

In the following description, numerous specific details are set forth to provide a more thorough understanding of the various embodiments. However, it will be apparent to one of skilled in the art that the inventive concepts may be practiced without one or more of these specific details.

As noted above, a modern utility distribution infrastructure often includes network devices that are configured to monitor and coordinate the distribution of resources at various locations. Each network device monitors resource distribution at a different location to generate metrology data, and then periodically reports the metrology data to a control center across a wireless network.

Network devices sometimes reside at remote locations and can therefore have difficulty accessing the wireless network to report metrology data. To address this issue, remotely-located network devices can be coupled to the wireless network via one or more network device relays. A given network device relay forwards network traffic received from a given remotely-located network device to the wireless network. The given network device relay also forwards network traffic received from the wireless network to the remotely-located network device. In this manner, network device relays operate as intermediaries between remotely-located network devices and the wireless network. However, conventional network device relays suffer from several drawbacks.

First, conventional network device relays are typically coupled to mains power and therefore lose power during power outages, causing any remotely-located network devices to lose network connectivity. Some types of network device relays include backup batteries, but these backup batteries usually only provide an eight-hour "holdup" period during which network device operations continue. Many utility providers need a longer holdup period, and therefore cannot use conventional network device relays.

Second, conventional network device relays are often very expensive to manufacture, deploy, and maintain. Due to the excessive cost associated with conventional network devices, utility providers oftentimes maximize the number of remotely-located network devices that are coupled to a given network device relay for network access. However, this technique can overload the network device relay and cause significant network latency.

To address these issues, embodiments of the invention include a solar-powered device (SPD) relay node that is powered by a solar hybrid battery system. The solar hybrid battery system includes a solar panel, a primary cell, and a secondary cell. The secondary cell includes enough power storage to be capable of powering the SPD relay node during the longest interval of darkness in the region where the SPD relay node is deployed (also known as the winter solstice). The solar panel is sized relative to the secondary cell to be capable of fully recharging the secondary cell during the shortest daily interval of daylight in the region where the SPD relay node is deployed, even under conditions of limited solar irradiance (e.g. due to cloud cover). The primary cell can charge the secondary battery if the SPD relay node is shelved or malfunctioning to prevent the secondary cell from becoming overly depleted.

The SPD relay node can be coupled to a remotely-located "leaf" node in order to provide the leaf node with network access. The SPD relay node routes network traffic to and from the leaf node via one or more different paths that traverse other SPD relay nodes that reside upstream of the SPD relay node. The SPD relay node determines a specific path across which to route the network traffic based on several different factors associated with the upstream SPD relay nodes, including battery level, solar generation rate, and link quality. The SPD relay node generates a routing metric for each upstream SPD relay node based on these different factors and then routes traffic across the upstream SPD relay nodes based on the routing metric and based on a priority level associated with the network traffic.

One technological advantage of the disclosed approach is that the SPD relay node continues to operate normally during power outages because the SPD relay node does not rely on mains power. Accordingly, the SPD relay node can meet the holdup period requirements set forth by many utility providers. Another technological advantage of the disclosed approach is that SPD relay nodes can route network traffic with very low latency compared to conventional network device relays because numerous SPD relay nodes can be distributed throughout the wireless network, thereby distributing the burden of processing network traffic. These technological advantages represent multiple technological advancements relative to prior art approaches.

System Overview

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114. PANs B and C further include one or more battery-powered device (BPD) nodes 116 and one or more solar-powered device (SPD) nodes 118.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. SPD nodes 118 include solar panels that generate power from sunlight. SPD nodes 118 store generated power in secondary cells and draw power from those secondary cells to support node operations.

MPD nodes 114, BPD nodes 116, and SPD nodes 118 are coupled to, or included within, a utility distribution infrastructure (not shown) that distributes a resource to consumers. MPD nodes 114, BPD nodes 116, and SPD nodes 118 gather sensor data related to the distribution of the resource, process the sensor data, and communicate processing results and other information to control center 130. Border router nodes 112 operate as access points to provide MPD nodes 114, BPD nodes 116, and SPD nodes 118 with access to control center 130.

Any of border router nodes 112, MPD nodes 114, BPD nodes 116, and SPD nodes 118 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
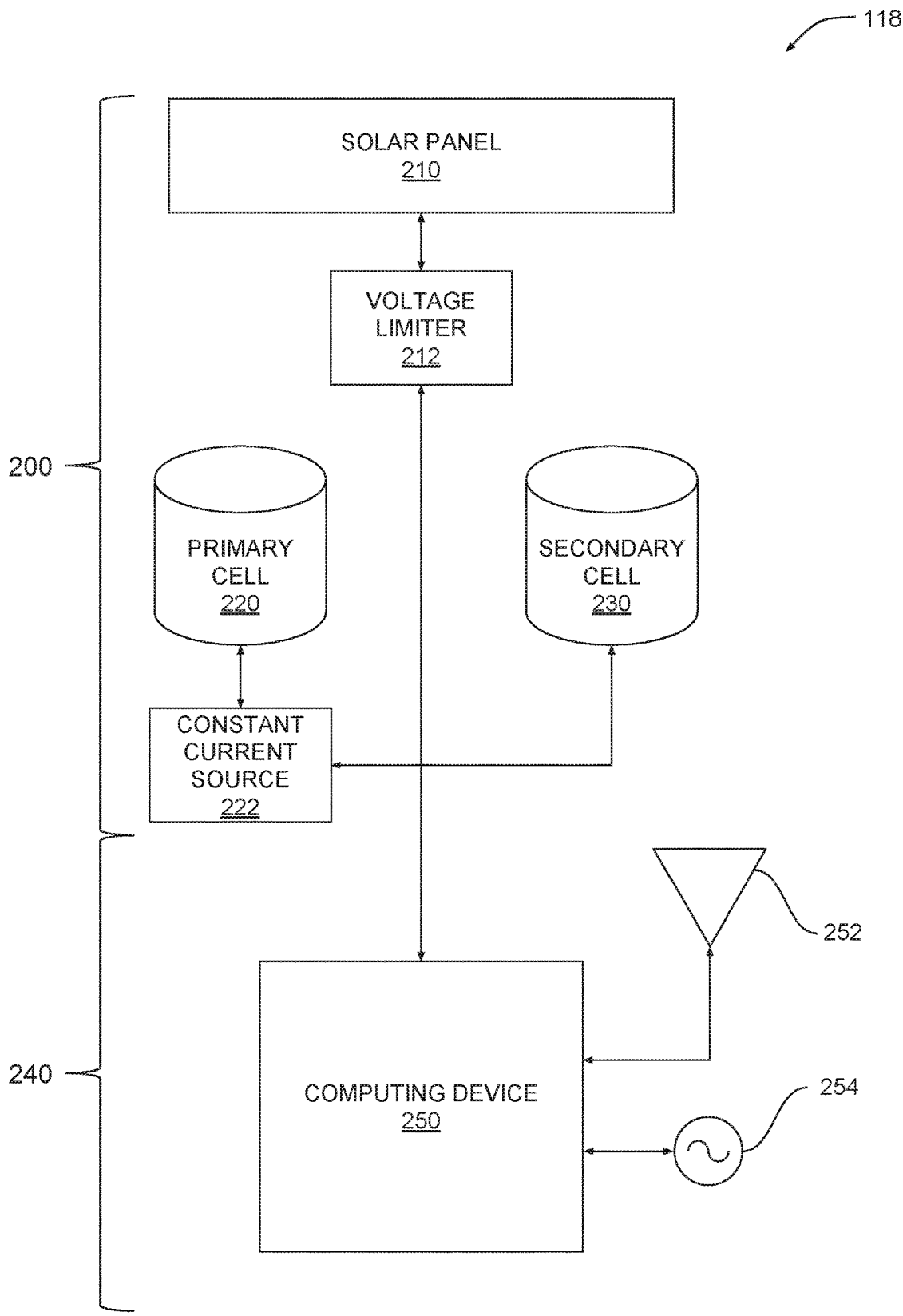
FIG. 2 is a more detailed illustration of one of the solar-powered device (SPD) nodes of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates a power subsystem and a network subsystem that may be included in any of the SPD nodes 118 of network system 100.

Solar-Powered Device Node Design

FIG. 2 is a more detailed illustration of one of the solar-powered device (SPD) nodes of FIG. 1, according to various embodiments. As shown, an SPD node 118 includes a power subsystem 200 and a network subsystem 240. Power subsystem 200 includes a solar panel 210, a voltage limiter 212, a primary cell 220, a constant current source 222, and a secondary cell 230, coupled together. Primary cell 220 may be a Lithium Thionyl Chloride battery and secondary cell 230 may be an extended lifetime Lithium Ion battery, such as those manufactured by Tadiran, LTD. Network subsystem 240 includes a computing device 250, one or more transceivers 252, and an oscillator 254. Some or all of the SPD nodes 118 shown in FIG. 1 may include instances of power subsystem 200 and network subsystem 240.

Solar panel 210 is coupled to voltage limiter 212. Primary cell 220 is coupled to constant current source 222. Secondary cell 230 is coupled to voltage limiter 212 and constant current source 222. Computing device 250 is coupled to solar panel 210 via voltage limiter 212, to primary cell 220 via constant current source 222, and to secondary cell 230. Computing device 250 is also coupled to transceiver 252 and oscillator 254.

In operation, computing device 250, transceiver 252, and oscillator 254 draw power from secondary cell 230 to support the operation of SPD node 118. Computing device 250, transceiver 252, and oscillator 254 can also draw power from primary cell 220 to support the operation of the SPD node 118, although primary cell 220 may be omitted in some embodiments. Node operations include gathering metrology data from a utility line where the SPD node 118 is coupled, receiving data packets from other nodes, analyzing and/or processing data, transmitting data packets to other nodes, monitoring power generation of solar panel 210, and reporting status information to control center 130. Computing device 250 receives and/or transmits data via transceiver 252 based on timing signals generated by oscillator 254. Computing device 250 generally operates on a continuous basis and does not power down to conserve power during normal operations. Computing device 250 includes a processor that executes a software application to perform any of the node-oriented operations discussed herein, as also described in greater detail below in conjunction with FIG. 3.

During the day, solar panel 210 charges secondary cell 230. In particular, solar panel 210 converts sunlight into power and then stores this power in secondary cell 230. Voltage limiter 212 limits the voltage of that power to avoid damaging secondary cell 220. During the night, solar panel 210 does not charge secondary cell 230 and various node operations cause secondary cell 230 to deplete. Voltage limiter 212 prevents backflow of power from secondary cell 230 to solar panel 210 when solar panel 210 is unable to generate power, thereby preventing leakage of secondary cell 230 as well as damage to solar panel 210.

The storage capacity of secondary cell 230 and the power generation rate of solar panel 210 are determined to meet two specific design criteria. First, the storage capacity of secondary cell 230 is just sufficient or more than sufficient to power the SPD node 118 during the longest night of the year in the geographical location where the node is deployed. For example, secondary cell 230 could have a storage capacity that is 10% greater than the minimum storage capacity needed to power the SPD node 118 during the longest night of the year in the geographical location where the node is deployed. This approach can compensate for capacity fade associated with secondary cell 230. As referred to herein, the term "night" refers to a continuous interval of darkness associated with one or more solar days.

Second, the power generation rate of solar panel 200 is sufficient to both power the SPD node 118 and fully recharge secondary cell 230 during a day with lower than normal solar irradiance and/or the shortest day of the year in the geographical location where the node is deployed. For example, solar panel 210 could have a power generation rate that is sufficient to both power the SPD node 118 and fully recharge secondary cell 230 during a very cloudy and/or very short day. As referred to herein, the term "day" refers to a continuous interval of daylight associated with one or more solar days. A day with lower than normal solar irradiance may have an amount of solar irradiance that is 15% or less than the average amount of daytime solar irradiance in the region where the SPD node 118 is deployed.

Importantly, configuring secondary cell 230 and solar panel 210 based on the two design criteria described above allows a very small and inexpensive secondary cell 230 with a very long operational lifetime to be used. In some configurations, secondary cell 230 can have an operational lifetime of over 20 years. Accordingly, the disclosed techniques are well-suited for implementation in a variety of different battery-powered devices, beyond those associated with networks. For example, power subsystem 200 could be included in a Fast Pass device, a shipping container data logger, a G-shock and/or Global Positioning System (GPS) location logger, a parking occupancy sensor, a motion and/or presence detector, a thermostat, a light controller, a remote terminal unit, and so forth.

For various reasons, a given SPD node 118 that includes power subsystem 200 is very inexpensive compared to a conventional network device that needs to be coupled to mains power. In particular, because power subsystem 200 need not be coupled to mains power, power subsystem 200 is relatively simple and the given SPD node 118 can thus be manufactured at little cost. Further, because power subsystem 200 generates power from sunlight, a technician does not need to tie the given SPD node 118 into mains power, reducing installation overhead. Additionally, because the given SPD node 118 need not be tied into mains power, the given SPD node 118 does not have to be deployed on a utility pole, thereby eliminating pole lease fees.

Because SPD nodes 118 are very inexpensive and do not have to be coupled to mains power, SPD nodes 118 can be widely distributed across the geographical area where FAN 110 resides. SPD nodes 118 are especially well-suited for deployment as relay nodes in remote locations where mains power may not be available. In some instances, one or more leaf nodes may reside in such remote locations and have difficulty accessing FAN 110. To address this situation, one or more SPD nodes 118 can be deployed as relay nodes to provide these leaf nodes with enhanced network access that persists during power outages.

Solar-Powered Device Node Hardware

Figure 3:
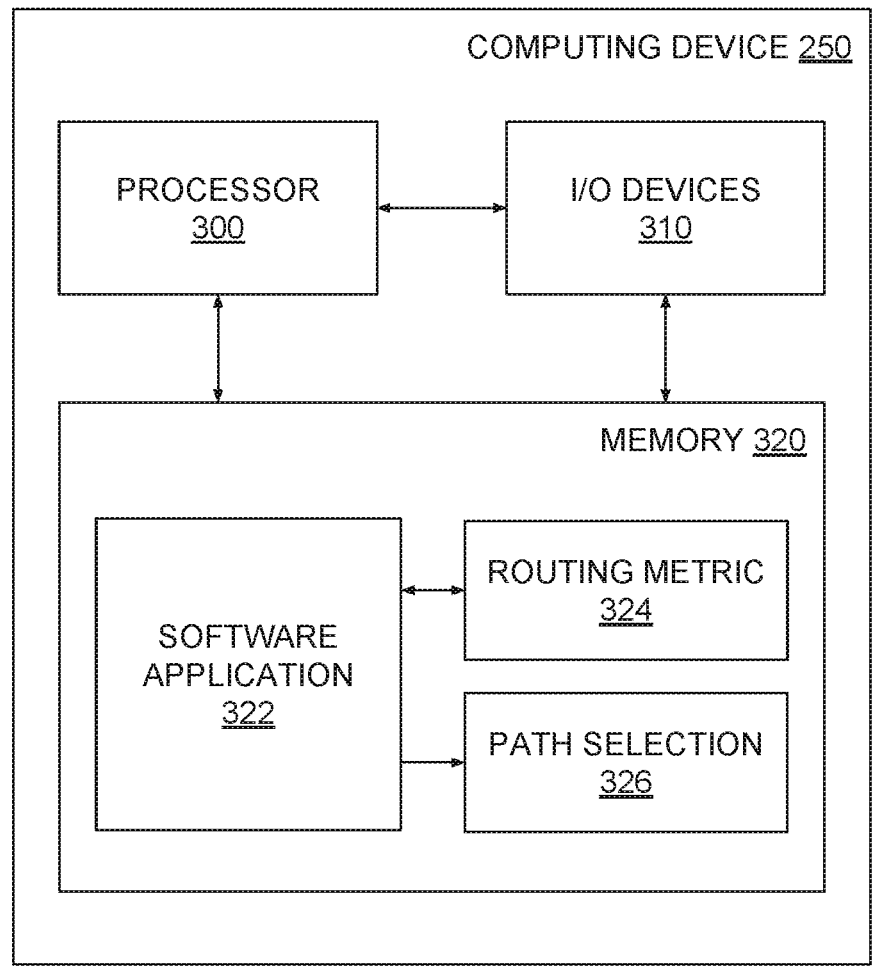
FIG. 3 is a more detailed illustration of the computing device of FIG. 2, according to various embodiments.

FIG. 3 is a more detailed illustration of the computing device of FIG. 2, according to various embodiments. As shown, computing device 240 includes a processor 300, input/output (I/O) devices 310, and memory 320, coupled together. Processor 300 may include any hardware configured to process data and execute software applications. Processor 300 may include real-time clock (RTC) (not shown) according to which processor 300 maintains an estimate of the current time. I/O devices 310 include devices configured to receive input, devices configured to provide output, and devices configured to both receive input and provide output. Memory 320 may be implemented by any technically feasible storage medium. Memory 320 includes a software application 322, a routing metric 324, and a path selection 326. Software application 322 includes program code that, when executed by processor 300, performs any of the node-oriented computing functionality described herein.

In operation, software application 322 configures the SPD node 118 of FIG. 3 to operate as a relay node in order to provide remotely-located leaf nodes with enhanced network access. Software application 322 establishes communications with one or more leaf nodes via the discovery process described above in conjunction with FIG. 1. Software application 322 also establishes communications with one or more SPD nodes 118 that reside upstream of the SPD node 118 via the discovery process. The upstream SPD nodes reside closer to control central 130 than does the SPD node 118, in terms of either geographical distance or hop count. Additionally, these upstream SPD nodes generally provide reliable network access but cannot be directly or easily reached by the leaf nodes. An exemplary portion of FAN 110 that includes these various types of nodes is described in greater detail below in conjunction with FIGS. 5-9.

Once the SPD node 118 establishes communications in the manner described above, software application 322 analyzes various paths that traverse FAN 110 via the upstream SPD nodes to generate routing metrics 324. Each routing metric 324 generally reflects the suitability of a different path for transporting network traffic. Subsequently, software application 322 receives network traffic from the connected leaf nodes and then generates path selection 326. Path selection 326 indicates a specific path for transporting the network traffic across FAN 110. Software application 324 generates path selection 326 based on the associated routing metric 324 and based on a priority level associated with the network traffic. Software application 324 then routes the network traffic according to path selection 326. Various engines included in software application 324 that perform the above-described operations are described in greater detail below in conjunction with FIG. 4.

Solar-Powered Device Node Software

Figure 4:
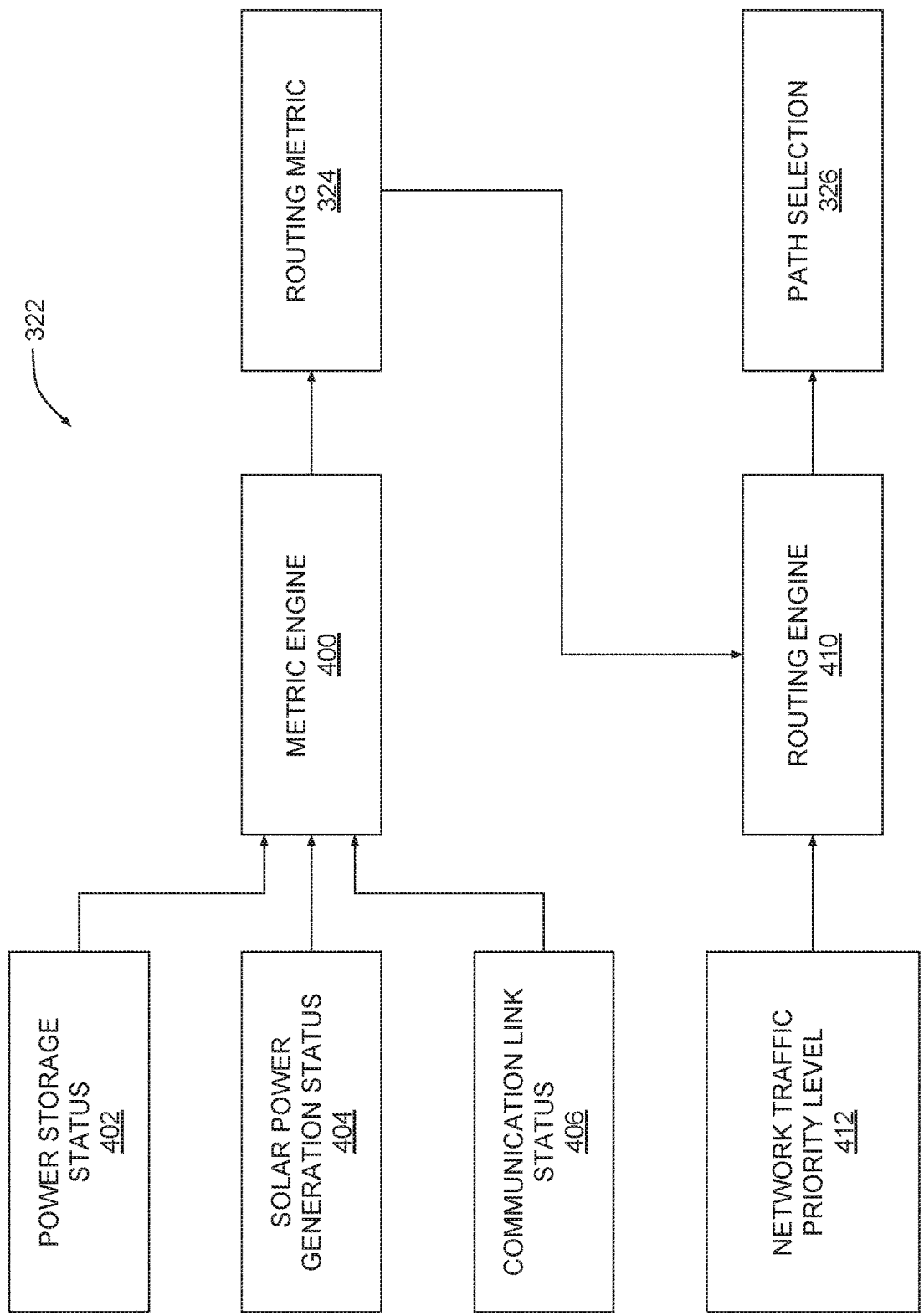
FIG. 4 is a more detailed illustration of the software application of FIG. 3, according to various embodiments.

FIG. 4 is a more detailed illustration of the software application of FIG. 3, according to various embodiments. As shown, software application 322 includes a metric engine 400 and a routing engine 410. Metric engine 400 generates a routing metric 324 associated with a given path across FAN 110 based on various data associated with an upstream SPD node 118 that resides along that path. In particular, metric engine 400 processes a power storage status 402, a solar power generation status 404, and a communication link status 406 associated with the upstream SPD node 118 to generate routing metric 324.

Power storage status 402 associated with the upstream SPD node 118 reflects an amount of power stored by the upstream SPD node 118 in primary cells and/or secondary cells. Solar power generation status 404 associated with the upstream SPD node 118 reflects a rate at which the upstream SPD node 118 generates power via a solar panel. Communication link status 406 associated with the upstream SPD node 118 reflects various characteristics of a communication link between the SPD node 118 and the upstream SPD node 118. Those characteristics include one or more of a link quality, a link cost, a signal strength, a signal-to-noise ratio, and a packet loss rate. Metric engine 400 generates routing metric 324 corresponding to the upstream SPD node 118 in order to quantify the suitability of the upstream SPD node 118 for routing network traffic across FAN 110.

For example, an upstream SPD node 118 with a higher battery level would be a more suitable choice for routing network traffic compared to an upstream SPD node 118 with a lower battery level. Among other things, the upstream SPD node 118 with the lower battery level could potentially deplete all remaining battery power and shut off without relaying the network traffic across FAN 110. Similarly, an upstream SPD node 118 with a higher solar power generation rate would be a more suitable choice for routing network traffic compared to an upstream SPD node 118 with a lower solar power generation rate. In particular, the upstream SPD node 118 with the lower solar power generation rate could potentially not be able to replenish depleted power very quickly, which could interfere with the ability of that node to relay network traffic across FAN 110. Further, an upstream SPD node 118 that maintains a higher quality communication link would be a more suitable choice for routing network traffic compared to an upstream SPD node 118 that maintains a lower quality communication link. The upstream SPD node 118 that maintains the lower quality communication link could experience data loss issues during transmission of the network traffic, potentially causing a situation where the network traffic needs to be re-transmitted.

Metric engine 400 may process the statuses described above in any technically manner to generate routing metric 324. For example, metric engine 400 could normalize the various quantities associated with each status and then generate a weighted sum of those normalized quantities. In doing so, metric engine 400 could implement any technically feasible weighting. In one embodiment, metric engine 400 may gather power storage status 402, solar power generation status 404, and communication link status 406 from each upstream SPD node 118 and then generate a different routing metric 324 for each upstream SPD node 118. In another embodiment, a given upstream SPD node 118 may independently execute an instance of metric engine 400 to generate a routing metric 324 that reflects the suitability of routing network traffic through that node. The given upstream SPD node 118 may then transmit the routing metric 324 to the SPD node 118 and potentially other nodes. In either embodiment, routing metric 324 can be periodically re-generated to reflect changing node and/or network conditions.

Metric engine 400 generally performs the above operations once communication is established between the SPD node 118 and the one or more upstream SPD nodes 118. Subsequently, when the SPD node 118 receives network traffic from one or more of the leaf nodes, routing engine 410 analyzes the network traffic to determine network traffic priority level 412. For example, routing engine 410 could analyze a data packet included in the network traffic and extract a priority bit indicating whether the data packet is a high priority data packet or a low priority data packet. The network traffic could also have a range of priority values.

Based on network traffic priority level 412 and routing metric 324, routing engine 410 generates path selection 326 indicating a specific upstream SPD node 118 across which to route the network traffic. For example, routing engine 410 could generate path selection 326 to indicate that high priority network traffic should be routed across one or more upstream SPD nodes 118 having higher routing metrics 324, and low priority network traffic should be routed across one or more upstream SPD nodes 118 having lower routing metrics 324. As a general matter, routing engine 410 generates path selections 326 that minimize power expenditure by avoiding situations where network traffic needs to be re-transmitted. FIGS. 5-8 set forth various examples of how routing engine 410 generates path selections based on routing metrics and/or network traffic priority levels.

Routing Network Traffic Across Solar-Powered Device Relay Nodes

Figure 5:
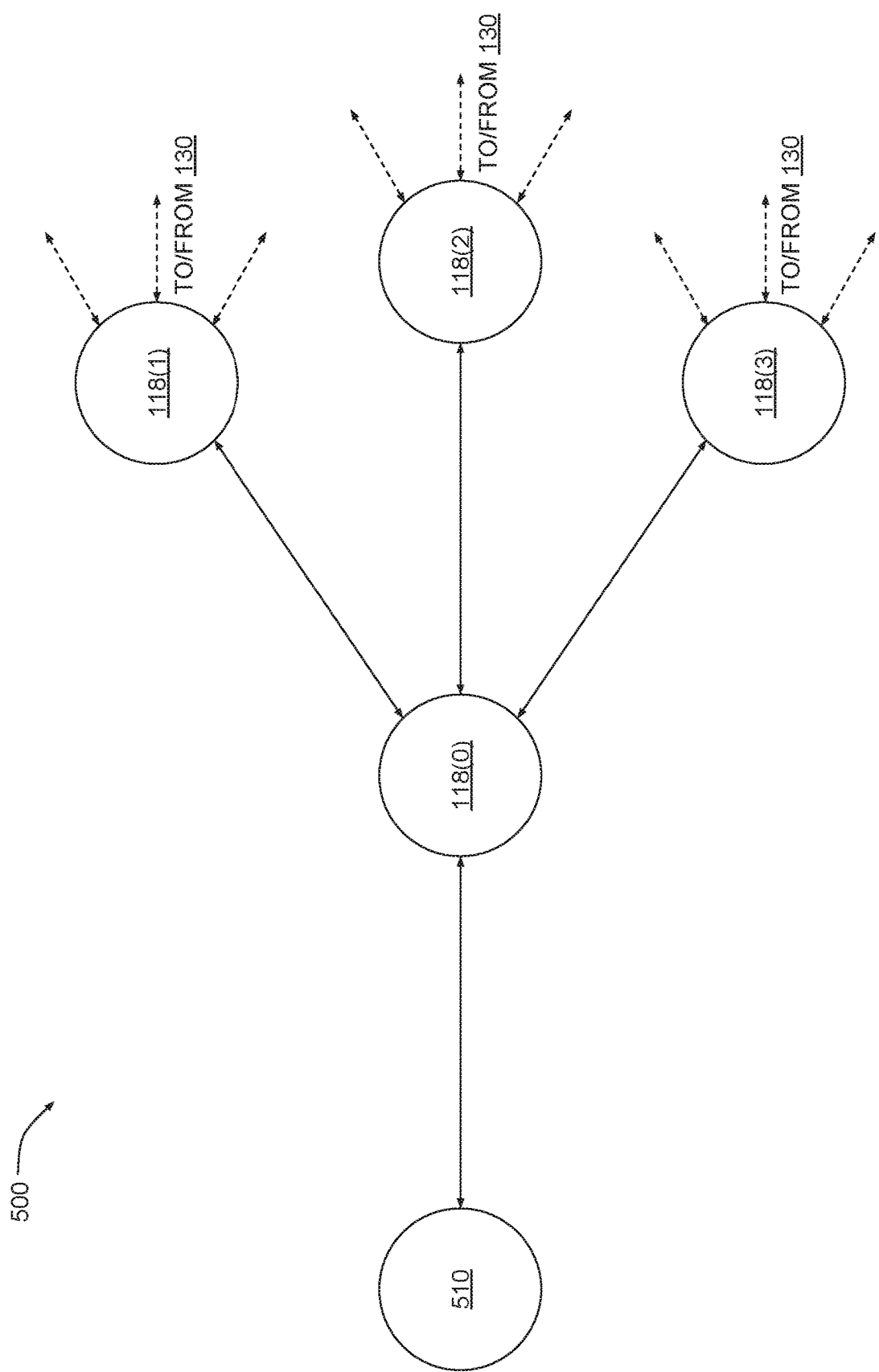
FIG. 5 illustrates a portion of the network system of FIG. 1 where a solar-powered device (SPD) node operates as a relay node, according to various embodiments.

FIG. 5 illustrates a portion of the field area network of FIG. 1 where a solar-powered device (SPD) node operates as a relay node, according to various embodiments. As shown, a portion 500 of FAN 110 includes a leaf node 510 and SPD nodes 118(0), 118(1), 118(2), and 118(3). Leaf node 510 is coupled to SPD node 118(0), and SPD node 118(0) resides upstream of leaf node 510. SPD node 118(0) is coupled to SPD nodes 118(1), 118(2), and 118(3), and SPD nodes 118(1), 118(2), and 118(3) reside upstream of SPD node 118(0).

Leaf node 510 can be any of the nodes shown in FIG. 1, including an MPD node 114, a BPD node 116, or an SPD node 118. Leaf node 510 is coupled to a utility distribution infrastructure (not shown) and is configured to generate metrology data related to the distribution of resources. Additionally, leaf node 510 may reside in a location that provides limited network access. Conversely, SPD nodes 118(1), 118(2), and 118(3) reside in locations that provide more reliable network access, allowing effective communication with control center 130. SPD node 118(0) is coupled between leaf node 510 and SPD nodes 118(1), 118(2), and 118(3). SPD node 118(0) is configured to operate as a relay between leaf node 510 and SPD nodes 118(1), 118(2), and 118(3) in order to provide leaf node 510 with the reliable network access associated with SPD nodes 118(1), 118(2), and 118(3).

The network topology associated with portion 500 of FAN 110 advantageously allows leaf node 510 to transmit and receive network traffic across FAN 110 more reliably than otherwise possible. In addition, SPD node 118(0) does not lose power during power outages, allowing leaf node 510 to continue to transmit metrology data in an uninterrupted manner. Further, because SPD node 118(0) is relatively inexpensive for the reasons previously discussed, numerous leaf nodes need not be coupled to SPD node 118(0) in order to minimize costs. For example, other leaf nodes could be coupled to other dedicated SPD nodes 118 instead of coupling all of those leaf nodes to SPD node 118(0). Accordingly, SPD node 118(0) can route traffic to and from leaf node 510 with low latency, given that SPD node 118(0) does not have to route traffic associated with other leaf nodes.

SPD node 118(0) can perform several different techniques to effectively and efficiently relay network traffic received from leaf node 510 across one or more of SPD nodes 118(1), 118(2), and 118(3) to control center 130. SPD node 118(0) performs each of these techniques based on routing metrics 324 generated for SPD nodes 118(1), 118(2), and 118(3), as described below in conjunction with FIG. 6.

Figure 6:
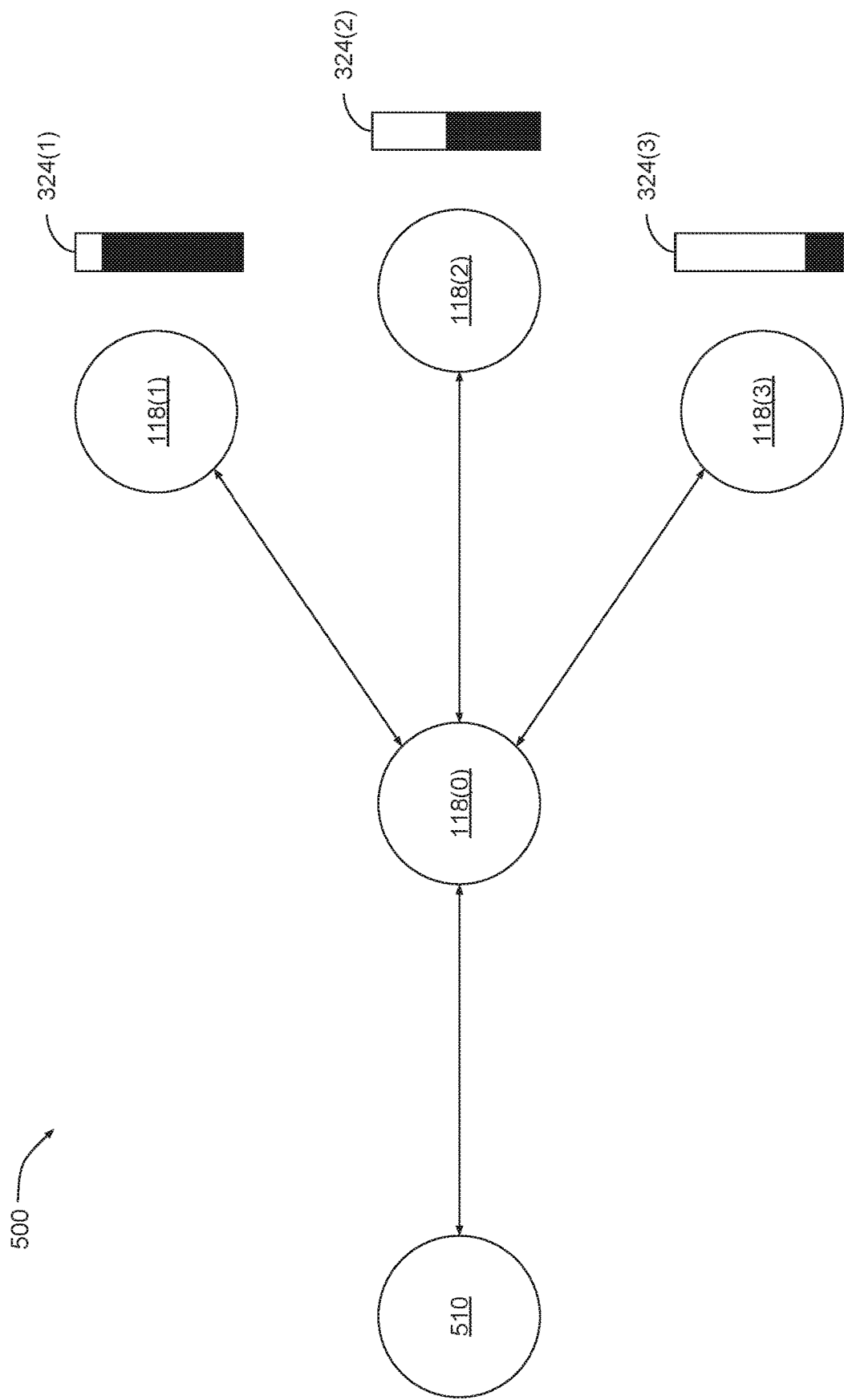
FIG. 6 illustrates various routing metrics that the SPD node of FIG. 5 can generate for upstream SPD nodes, according to various embodiments.

FIG. 6 illustrates various routing metrics that the SPD node of FIG. 5 can generate for upstream SPD nodes, according to various embodiments. As shown, SPD nodes 118(1), 118(2), and 118(3) are associated with routing metrics 324(1), 324(2), and 324(3), respectively. SPD node 118(0) generates these routing metrics in the manner described above for each of SPD nodes 118(1), 118(2), and 118(3). For example, SPD node 118(0) could generate routing metric 324(1) based on one or more of a power storage status associated with SPD node 118(1), a solar power generation rate associated with SPD node 118(1), and a communication link status associated with a communication link between SPD node 118(0) and SPD node 118(1). Routing metric 324(1) is comparatively higher than routing metrics 324(2) and 324(3), indicating that SPD node 118(1) is more suitable for routing network traffic compared to SPD nodes 118(2) and 118(3). Routing metric 324(2) is comparatively higher than routing metric 324(3), indicating the SPD node 118(2) is more suitable for routing network traffic compared to SPD node 118(3). SPD node 118(0) can relay network traffic according to several different techniques that are described in greater detail below.

Figure 7:
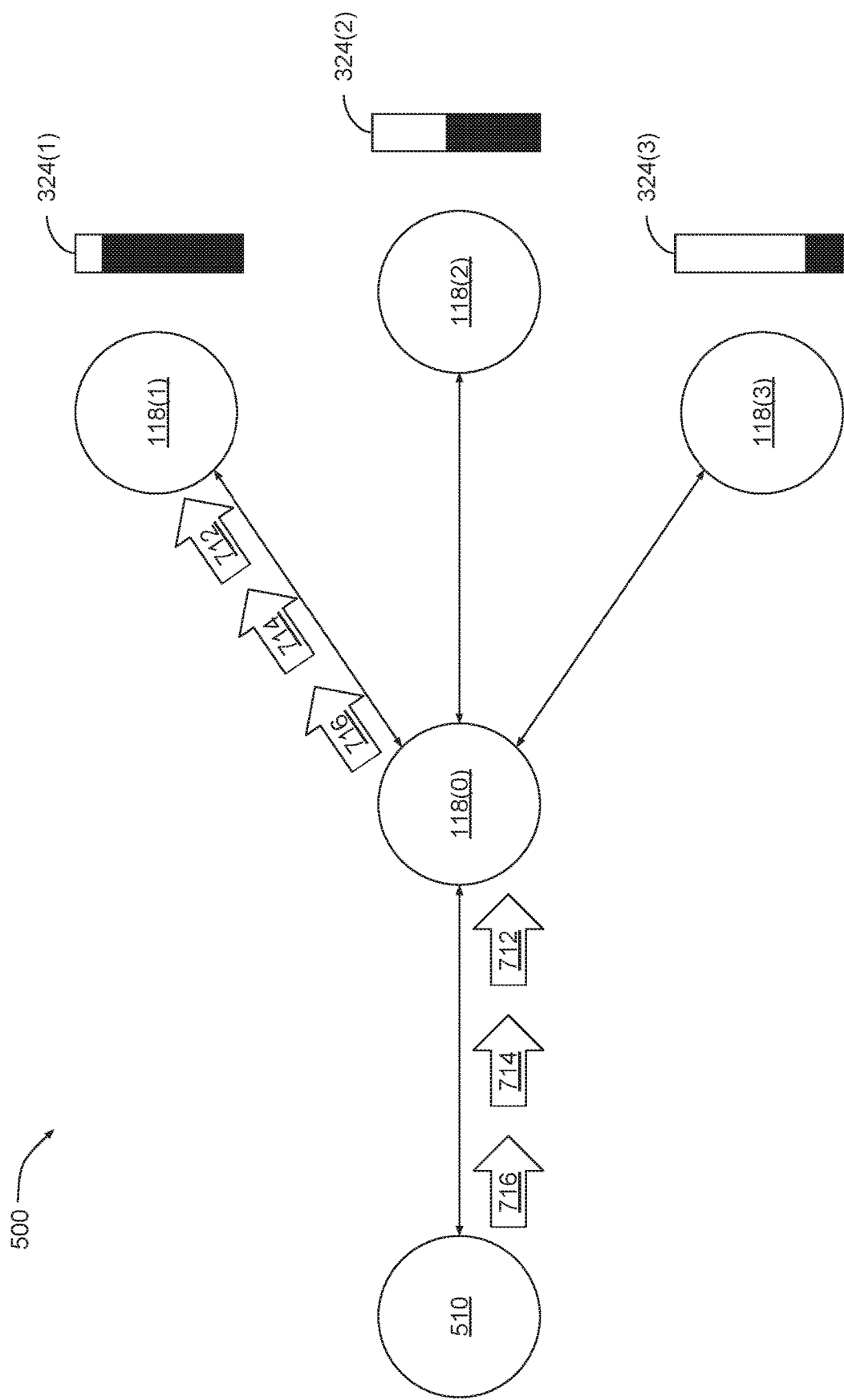
FIG. 7 illustrates how the SPD node of FIG. 5 relays network traffic to an upstream SPD node based on a routing metric, according to various embodiments.

FIG. 7 illustrates how the SPD node of FIG. 5 relays network traffic to an upstream SPD node with the greatest routing metric, according to various embodiments. As shown, leaf node 510 transmits network traffic that includes data packets 712, 714, and 716. In response to receiving these data packets, SPD node 118(0) analyzes routing metrics 324(1), 324(2), and 324(3) and determines that routing metric 324(1) has the greatest value. SPD node 118(0) then relays data packets 712, 714, and 716 through SPD node 118(1).

Figure 8:
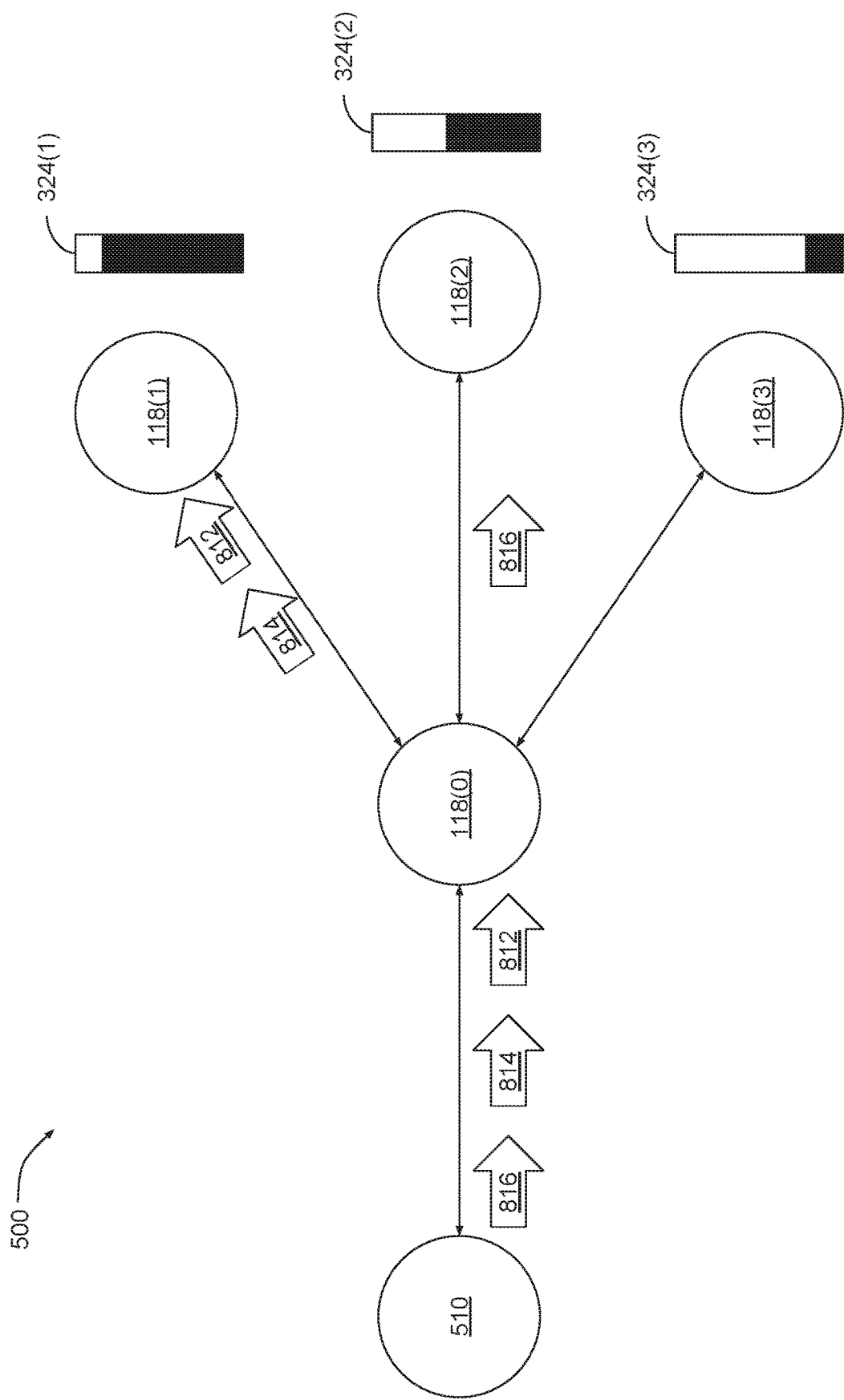
FIG. 8 illustrates how the SPD node of FIG. 5 distributes network traffic across multiple upstream SPD nodes based on multiple routing metrics, according to various embodiments.

FIG. 8 illustrates how the SPD node of FIG. 5 distributes network traffic across multiple upstream SPD nodes based on multiple routing metrics, according to various embodiments. As shown, leaf node 510 transmits network traffic that includes data packets 812, 814, and 816. In response to receiving these data packets, SPD node 118(0) distributes data packets 812, 814, and 816 to SPD nodes 118(1), 118(2), and 118(3) in proportion to the corresponding routing metrics 324(1), 324(2), and 324(3). In particular, SPD node 118(0) relays more data packets to SPD node 118(1) because routing metric 324(1) is comparatively higher than the other routing metrics and/or above a threshold value. SPD node 118(0) also relays fewer data packets to SPD node 118(2) because routing metric 324(2) is comparatively lower than routing metric 324(1) and/or below the threshold value. SPD node 118(0) does not relay any data packets to SPD node 118(3) because routing metric 324(3) is very low and/or below another threshold value.

Figure 9:
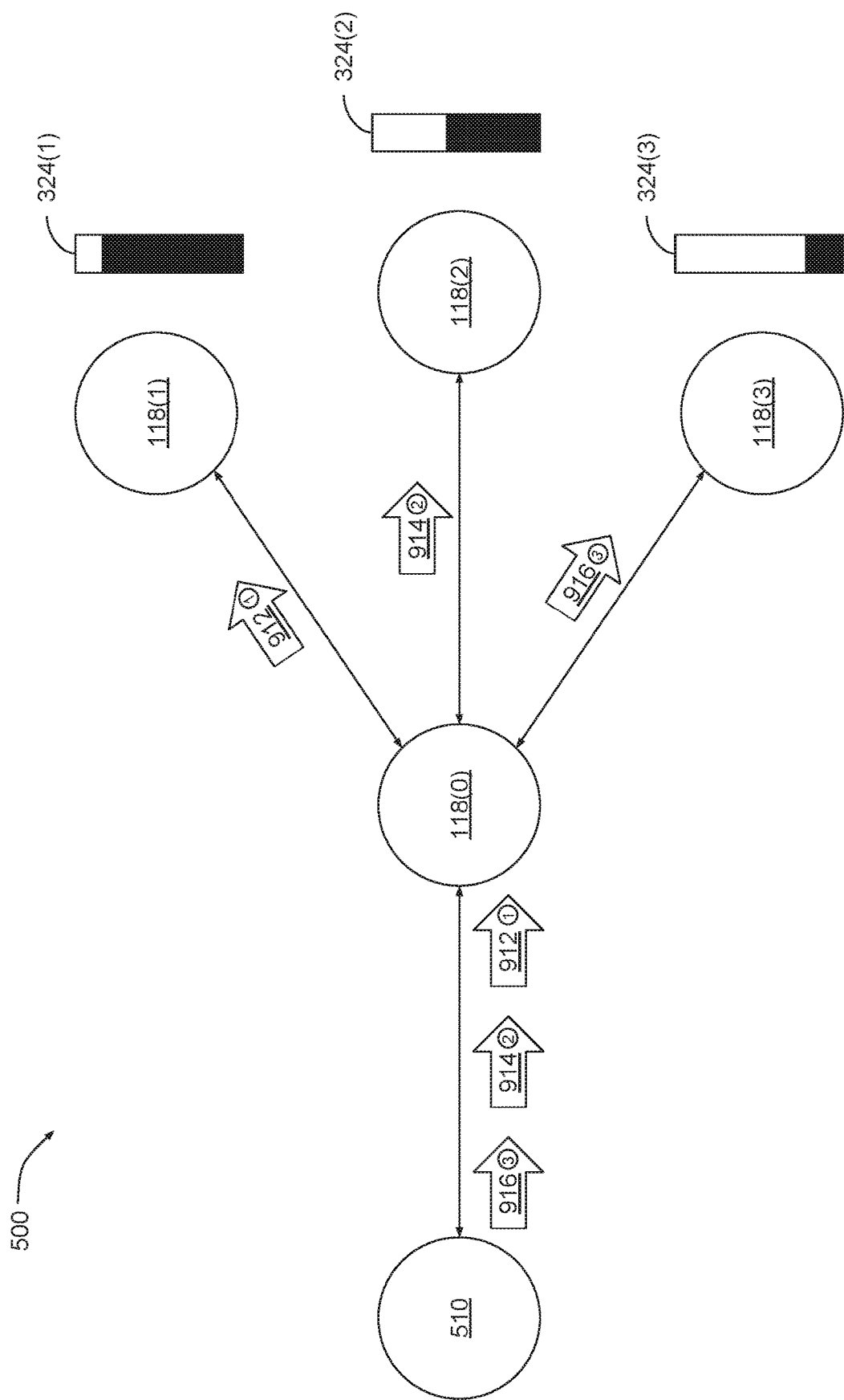
FIG. 9 illustrates how the SPD node of FIG. 5 distributes network traffic across multiple upstream SPD nodes based on network traffic priority levels, according to various embodiments.

FIG. 9 illustrates how the SPD node of FIG. 5 distributes network traffic across multiple upstream SPD nodes based on network traffic priority levels, according to various embodiments. As shown, leaf node 510 transmits network traffic that includes data packets 912, 914, and 916. Each of these data packets has a different priority level. Data packet 912 has a priority level of one, meaning that data packet 912 is a high-priority data packet. Data packet 914 has a priority level of two, meaning that data packet 914 is a mid-priority data packet. Data packet 916 has a priority level of three, meaning that data packet 912 is a low-priority data packet.

In response to receiving data packets 912, 914, and 916, SPD node 118(0) analyzes the priority level of each data packet and identifies an upstream SPD node 118 with a routing metric that corresponds to that priority level. SPD node 118(0) then relays each data packet to the upstream SPD node 118 with the corresponding priority level. In particular, SPD node 118(0) relays data packet 912 having the highest priority level to SPD node 118(1), which has the highest routing metric. SPD node 118(0) relays data packet 914 having the mid-range priority level to SPD node 118(2), which has a mid-range routing metric. SPD node 118(0) relays data packet 916 having the lowest priority level to SPD node 118(3), which has the lowest routing metric. In this manner, SPD node 118(0) relays higher priority traffic to SPD nodes 118 with higher routing metrics and routes lower priority traffic to SPD nodes 118 with lower routing metrics.

Referring generally to FIGS. 5-9, SPD node 118(0) can perform any and all of the techniques described above in order to dynamically adjust how network traffic is relayed based on changing node conditions, changing network conditions, and changing environmental conditions. For example, if a given upstream node 118 suddenly loses the ability to generate solar power, SPD node 118(0) can responsively route traffic away from or around that upstream node. The techniques described herein can be effectively implemented to provide leaf nodes with network access that persists during power outages, thereby conferring a significant technological advantage compared to prior art techniques.

In various embodiments, a given SPD node 118 can maintain adjacency information associated with multiple leaf nodes coupled thereto and can then distribute this information to those leaf nodes after a power outage occurs to allow those leaf nodes to rapidly re-form a mesh network when power is restored. For example, suppose an SPD node 118 operates as a relay for several mains-powered leaf nodes that are meshed together. The SPD node 118 could maintain adjacency information for these leaf nodes. In the event of a power outage, those leaf nodes would lose power and lose connectivity with one another. Rather than repeating the discovery process to determine node adjacency when power is restored, those leaf nodes could instead connect to the SPD node 118, retrieve the adjacency information, and initiate communications with one another. This approach allows portions of FAN 110 to more rapidly re-initiate operations following power outages than possible with conventional mains powered network devices.

Relaying Network Traffic Based on Priority Level

Figure 10:
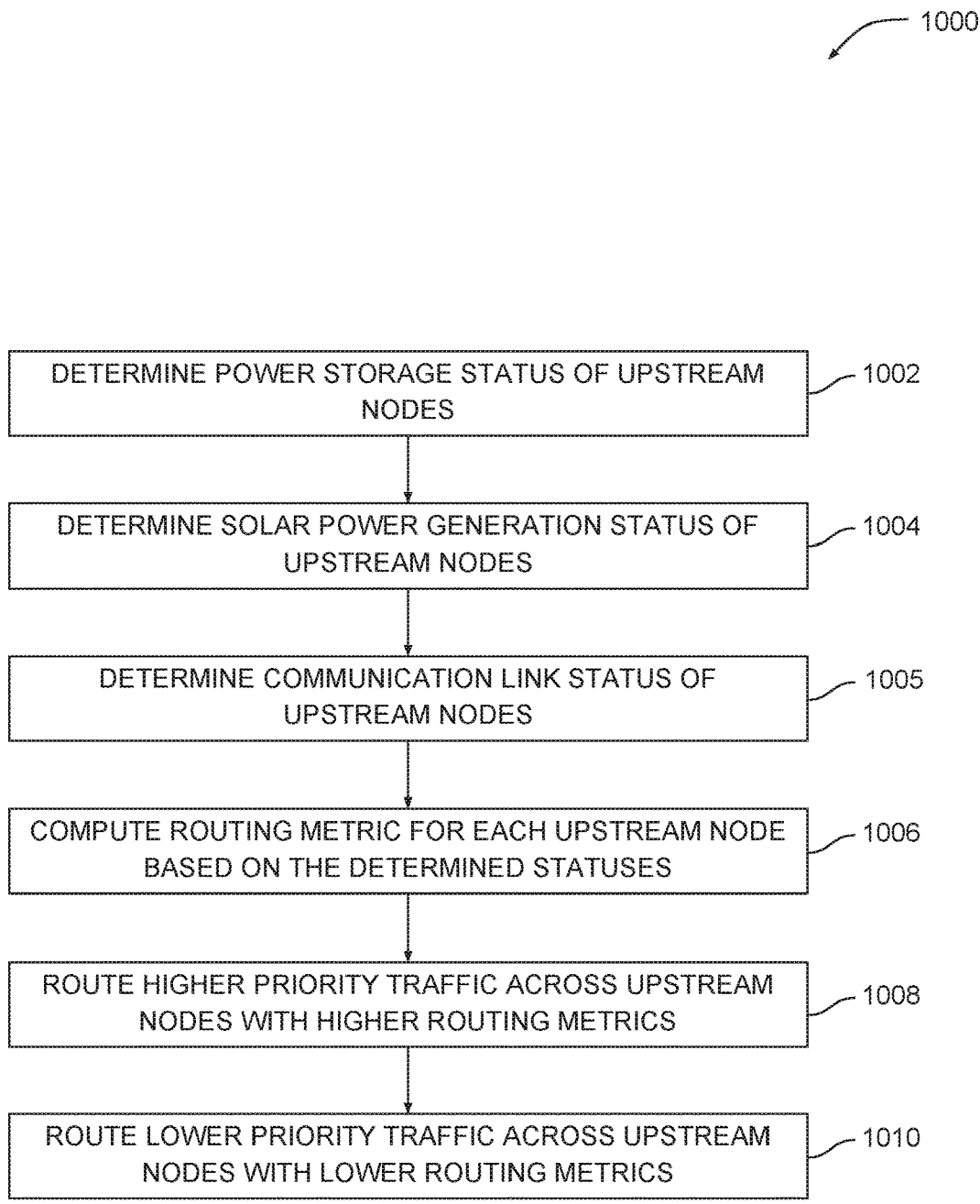
FIG. 10 is a flow diagram of method steps for routing network traffic within a wireless network via an SPD relay node, according to various embodiments.

FIG. 10 is a flow diagram of method steps for routing network traffic via an SPD relay node included in a wireless network, according to various embodiments. Although the method steps are described in conjunction with the systems of FIGS. 1-9, persons skilled in the art will understand that any system configured to perform the method steps in any order falls within the scope of the present invention.

As shown, a method 1000 includes a sequence of steps that are performed to determine how an SPD node 118 that is configured to operate as a relay node should route network traffic on behalf of one or more leaf nodes. The leaf nodes reside downstream of the SPD node 118. The SPD node 118 routes the network traffic to one or more SPD nodes 118 that reside upstream of the SPD node 118 (referred to herein as "upstream nodes"). These upstream nodes generally provide reliable network access. This particular configuration of nodes is also illustrated above in FIGS. 5-9. The various steps of the method 1000 are performed by the SPD node 118 after performing a discovery process to establish communications with the various leaf nodes and upstream nodes.

At step 1002, the SPD node 118 determines the power storage status of the different upstream nodes to which the SPD node 118 is coupled. The power storage status of a given upstream node reflects the amount of power stored by the upstream SPD node 118 in primary cells and/or secondary cells. A given upstream node can periodically report the power storage status to the SPD node 118, or, alternatively, transmit the power storage status in response to a query received from the SPD node 118.

At step 1004, the SPD node 118 determines the solar power generation status of the upstream nodes. The solar power generation status of a given upstream node indicates whether the given upstream node is currently generating power from sunlight. The solar power generation status can also reflect a rate at which the upstream node generates power via a solar panel. A given upstream node can periodically report the solar power generation status to the SPD node 118, or, alternatively, transmit the solar power generation status in response to a query received from the SPD node 118.

At step 1006, the SPD node 118 determines the communication link status of the upstream nodes. The communication link status associated with a given upstream reflects various characteristics of a communication link between the SPD node 118 and the upstream node. Those characteristics include one or more of a link quality, a link cost, a signal strength, a signal-to-noise ratio, and a packet loss rate. A given upstream node can periodically report the communication link status to the SPD node 118, or, alternatively, the SPD node 118 can independently test the communication link to determine the various characteristics mentioned above.

At step 1008, the SPD node 118 computes a routing metric for each upstream node based on the statuses determined at steps 1002, 1004, and 1006. For example, a metric engine included in the SPD node 118 could normalize the various quantities associated with each status and then generate a weighted sum of those normalized quantities. An exemplary metric engine is depicted in FIG. 4. The routing metric associated with a given upstream node quantifies the suitability of the upstream node for routing network traffic across FAN 110.

At step 1012, the SPD node 118 routes higher priority traffic across the upstream nodes with higher routing metrics. For example, a routing engine included in the SPD node 118 could analyze network traffic received from the one or more leaf nodes and identify any data packets marked as high priority. The routing engine could then generate a path selection indicating that the high priority data packets should be routed across the upstream node with a high routing metric.

At step 1014, the SPD node 118 routes lower priority traffic across upstream nodes with lower routing metrics. For example, the routing engine mentioned above could analyze network traffic received from the one or more leaf nodes and identify any data packets marked as low priority. The routing engine could then generate a path selection indicating that the low priority data packets should be routed across the upstream node with a low routing metric.

In sum, a solar-powered device (SPD) relay node is powered by a solar hybrid battery system. The solar hybrid battery system includes a solar panel, a primary cell, and a secondary cell. The secondary cell includes enough power storage to be capable of powering the SPD relay node during the longest interval of darkness in the region where the SPD relay node is deployed (also known as the winter solstice). The solar panel is sized relative to the secondary cell to be capable of fully recharging the secondary cell during the shortest daily interval of daylight in the region where the SPD relay node is deployed, even under conditions of limited solar irradiance (e.g. due to cloud cover). The primary cell can charge the secondary battery if the SPD relay node is shelved or malfunctioning to prevent the secondary cell from becoming overly depleted.

The SPD relay node can be coupled to a remotely-located "leaf" node in order to provide the leaf node with network access. The SPD relay node routes network traffic to and from the leaf node via one or more different paths that traverse other SPD relay nodes that reside upstream of the SPD relay node. The SPD relay node determines a specific path across which to route the network traffic based on several different factors associated with the upstream SPD relay nodes, including battery level, solar generation rate, and link quality. The SPD relay node generates a routing metric for each upstream SPD relay node based on these different factors and then routes traffic across the upstream SPD relay nodes based on the routing metric and based on a priority level associated with the network traffic.

One technological advantage of the disclosed design and approach relative to the prior art is that the SPD relay node does not rely on mains power and, therefore, is able to operate normally during power outages. Accordingly, the SPD relay node can meet the "holdup period" requirements set forth by many utility providers. Another technological advantage of the disclosed design and approach is that SPD relay nodes can route network traffic with lower latency compared to conventional network device relays because the design of the SPD allows for numerous SPD relay nodes to be deployed throughout a wireless network. Thus, the burdens of processing network traffic are more evenly distributed across the wireless network. These technological advantages represent one or more technological advancements over prior art designs and approaches.

1. Some embodiments include a system, comprising a power subsystem that includes a secondary power cell that stores a first portion of power that is consumed during a first time interval when performing network communications with one or more nodes included in a wireless network, and a solar panel that, when exposed to a first level of irradiance during a second time interval, generates the first portion of power for storage in the secondary power cell, wherein the first time interval comprises an interval of continuous darkness and the second time interval comprises an interval of continuous daylight, and a network subsystem that determines a first set of operational statuses associated with a first set of nodes included in the wireless network, generates a first set of routing metrics corresponding to the first set of nodes based on the first set of operational statuses, and relays network traffic received from a leaf node included in the wireless network to the first set of nodes based on the first set of routing metrics.

2. The system of clause 1, wherein the first set of operational statuses indicates a power storage status associated with a first node included in the first set of nodes.

3. The system of any of clauses 1-2, wherein the first set of operational statuses indicates a solar power generation status associated with a first node included in the first set of nodes.

4. The system of any of clauses 1-3, wherein the first set of operational statuses indicates a communication link status associated with a first node included in the first set of nodes.

5. The system of any of clauses 1-4, wherein the communication link status includes at least one of a communication link quality, a communication link cost, a communication link signal strength, a communication link signal-to-noise ratio, and a communication link packet loss rate.

6. The system of any of clauses 1-5, wherein the network subsystem generates the first set of routing metrics based on a weighted combination of the statuses included in the first set of operational statuses.

7. The system of any of clauses 1-6, wherein the network subsystem relays the network traffic by determining a first priority level associated with a first portion of the network traffic, determining a first routing metric included in the first set of routing metrics that corresponds to the first priority level, identifying a first node included in the first set of nodes that corresponds to the first routing metric, and transmitting the first portion of the network traffic to the first node.

8. The system of any of clauses 1-7, wherein the network subsystem relays the network traffic by identifying a first high-priority data packet included in the network traffic, determining a first routing metric included in the first set of routing metrics that exceeds a threshold value, determining a first node included in the first set of nodes that corresponds to the first routing metric, and transmitting the first high-priority data packet to the first node.

9. The system of any of clauses 1-8, wherein the network subsystem relays the network traffic by identifying a first low-priority data packet included in the network traffic, determining a first routing metric included in the first set of routing metrics that is less than a threshold value, determining a first node included in the first set of nodes that corresponds to the first routing metric, and transmitting the first low-priority data packet to the first node.

10. The system of any of clauses 1-9, wherein the first time interval and the second time interval occur during the winter solstice at a first location.

11. Some embodiments include a computer-implemented method for relaying network traffic across a wireless network, the method comprising storing a first portion of power in a secondary power cell, wherein the first portion of power is consumed during a first time interval when performing network communications with one or more nodes included in the wireless network, generating the first portion of power in response to a first level of irradiance during a second time interval, wherein the first time interval comprises an interval of continuous darkness and the second time interval comprises an interval of continuous daylight, determining a first set of operational statuses associated with a first set of nodes included in the wireless network, generating a first set of routing metrics corresponding to the first set of nodes based on the first set of operational statuses, and relaying network traffic received from a leaf node included in the wireless network to the first set of nodes based on the first set of routing metrics.

12. The computer-implemented method of clause 10, further comprising determining that the leaf node powered down in response to a power outage, determining that the leaf node powered up in response to a restoration of power, and transmitting adjacency information associated with the mesh network to the leaf node, wherein the leaf node bypasses a discovery process and establishes communications with one or more nodes included in the mesh network based on the adjacency information.

13. The computer-implemented method of any of clauses 11-12, wherein relaying the network traffic comprises determining a first priority level associated with a first portion of the network traffic, determining a first routing metric included in the first set of routing metrics that corresponds to the first priority level, identifying a first node included in the first set of nodes that corresponds to the first routing metric, and transmitting the first portion of the network traffic to the first node.

14. The computer-implemented method of any of clauses 11-13, wherein relaying the network traffic comprises identifying a first high-priority data packet included in the network traffic, determining a first routing metric included in the first set of routing metrics that exceeds a threshold value, determining a first node included in the first set of nodes that corresponds to the first routing metric, and transmitting the first high-priority data packet to the first node.

15. The computer-implemented method of any of clauses 11-14, wherein relaying the network traffic comprises identifying a first low-priority data packet included in the network traffic, determining a first routing metric included in the first set of routing metrics that is less than a threshold value, determining a first node included in the first set of nodes that corresponds to the first routing metric, and transmitting the first low-priority data packet to the first node.

16. The computer-implemented method of any of clauses 11-15, wherein the first time interval and the second time interval occur during the winter solstice at a first location.

17. The computer-implemented method of any of clauses 11-16, wherein the first set of operational statuses indicates at least one of a power storage status associated with a first node included in the first set of nodes and a solar power generation status associated with the first node.

18. The computer-implemented method of any of clauses 11-17, wherein the first set of operational statuses indicates a communication link status associated with a first node included in the first set of nodes.

19. The computer-implemented method of any of clauses 11-18, wherein the communication link status includes at least one of a communication link quality, a communication link cost, a communication link signal strength, a communication link signal-to-noise ratio, and a communication link packet loss rate.

20. The computer-implemented method of any of clauses 11-19, wherein the first level of irradiance is equal to about fifteen percent of an average level of solar irradiance at a first location, and wherein the secondary power cell has an operational lifetime of at least 20 years.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A node included in a wireless network, the node comprising:
    a power subsystem that includes:
        a secondary power cell that stores a first portion of power that is consumed during a first time interval when performing network communications with a first set of other nodes included in the wireless network, and
        a solar panel that, when exposed to a first level of irradiance during a second time interval, generates the first portion of power for storage in the secondary power cell, wherein the first time interval comprises an interval of continuous darkness and the second time interval comprises an interval of continuous daylight; and
    a network subsystem that:
        determines a first set of operational statuses that are associated with the first set of other nodes included in the wireless network and indicate at least one of a power storage status or a solar power generation status of a first node included in the first set of other nodes,
        generates a first set of routing metrics corresponding to the first set of other nodes based on the first set of operational statuses, and
        relays network traffic received from a leaf node included in the wireless network to the first set of other nodes based on the first set of routing metrics.

2. The system of claim 1, wherein the first set of operational statuses indicates the power storage status of the first node.

3. The system of claim 1, wherein the first set of operational statuses indicates the solar power generation status of the first node.

4. The system of claim 1, wherein the first set of operational statuses indicates a communication link status associated with the first node.

5. The system of claim 4, wherein the communication link status includes at least one of a communication link quality, a communication link cost, a communication link signal strength, a communication link signal-to-noise ratio, or a communication link packet loss rate.

6. The system of claim 1, wherein the network subsystem generates the first set of routing metrics based on a weighted combination of statuses included in the first set of operational statuses.

7. The system of claim 1, wherein the network subsystem relays the network traffic by:
   determining a first priority level associated with a first portion of the network traffic;
   determining a first routing metric included in the first set of routing metrics that corresponds to the first priority level;
   identifying a second node included in the first set of other nodes that corresponds to the first routing metric; and
   transmitting the first portion of the network traffic to the second node.

8. The system of claim 1, wherein the network subsystem relays the network traffic by:
   identifying a first high-priority data packet included in the network traffic;
   determining a first routing metric included in the first set of routing metrics that exceeds a threshold value;
   determining a second node included in the first set of other nodes that corresponds to the first routing metric; and
   transmitting the first high-priority data packet to the second node.

9. The system of claim 1, wherein the network subsystem relays the network traffic by:
   identifying a first low-priority data packet included in the network traffic;
   determining a first routing metric included in the first set of routing metrics that is less than a threshold value;
   determining a second node included in the first set of other nodes that corresponds to the first routing metric; and
   transmitting the first low-priority data packet to the second node.

10. The system of claim 1, wherein the first time interval and the second time interval occur during the winter solstice at a first location.

11. A computer-implemented method for relaying network traffic across a wireless network by a node included in the wireless network, the method comprising:
    storing a first portion of power in a secondary power cell, wherein the first portion of power is consumed during a first time interval when performing network communications with a first set of other nodes included in the wireless network;
    generating the first portion of power in response to a first level of irradiance during a second time interval, wherein the first time interval comprises an interval of continuous darkness and the second time interval comprises an interval of continuous daylight;
    determining a first set of operational statuses that are associated with the first set of other nodes included in the wireless network and indicate at least one of a power storage status or a solar power generation status of a first node included in the first set of other nodes;
    generating a first set of routing metrics corresponding to the first set of other nodes based on the first set of operational statuses; and
    relaying network traffic received from a leaf node included in the wireless network to the first set of other nodes based on the first set of routing metrics.

12. The computer-implemented method of claim 11, further comprising:
    determining that the leaf node powered down in response to a power outage;
    determining that the leaf node powered up in response to a restoration of power; and
    transmitting adjacency information associated with the wireless network to the leaf node, wherein the leaf node bypasses a discovery process and establishes communications with one or more nodes included in the wireless network based on the adjacency information.

13. The computer-implemented method of claim 11, wherein relaying the network traffic comprises:
    determining a first priority level associated with a first portion of the network traffic;
    determining a first routing metric included in the first set of routing metrics that corresponds to the first priority level;
    identifying a second node included in the first set of other nodes that corresponds to the first routing metric; and
    transmitting the first portion of the network traffic to the second node.

14. The computer-implemented method of claim 11, wherein relaying the network traffic comprises:
    identifying a first high-priority data packet included in the network traffic;
    determining a first routing metric included in the first set of routing metrics that exceeds a threshold value;
    determining a second node included in the first set of other nodes that corresponds to the first routing metric; and
    transmitting the first high-priority data packet to the second node.

15. The computer-implemented method of claim 11, wherein relaying the network traffic comprises:
    identifying a first low-priority data packet included in the network traffic;
    determining a first routing metric included in the first set of routing metrics that is less than a threshold value;
    determining a second node included in the first set of other nodes that corresponds to the first routing metric; and
    transmitting the first low-priority data packet to the second node.

16. The computer-implemented method of claim 11, wherein the first time interval and the second time interval occur during the winter solstice at a first location.

17. The computer-implemented method of claim 11, wherein the first set of operational statuses indicates a communication link status associated with the first node.

18. The computer-implemented method of claim 17, wherein the communication link status includes at least one of a communication link quality, a communication link cost, a communication link signal strength, a communication link signal-to-noise ratio, or a communication link packet loss rate.

19. The computer-implemented method of claim 11, wherein the first level of irradiance is equal to about fifteen percent of an average level of solar irradiance at a first location, and wherein the secondary power cell has an operational lifetime of at least 20 years.

* * * * *